Nov. 14, 1950 S. KELLER 2,529,556
APPARATUS FOR MANUFACTURE OF TRUSSES
Filed March 9, 1949 2 Sheets-Sheet 1
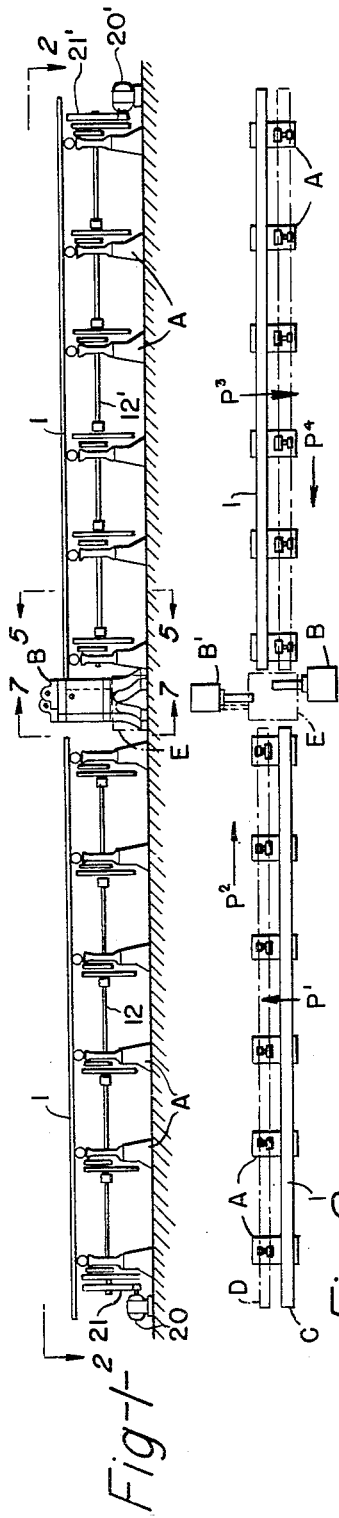
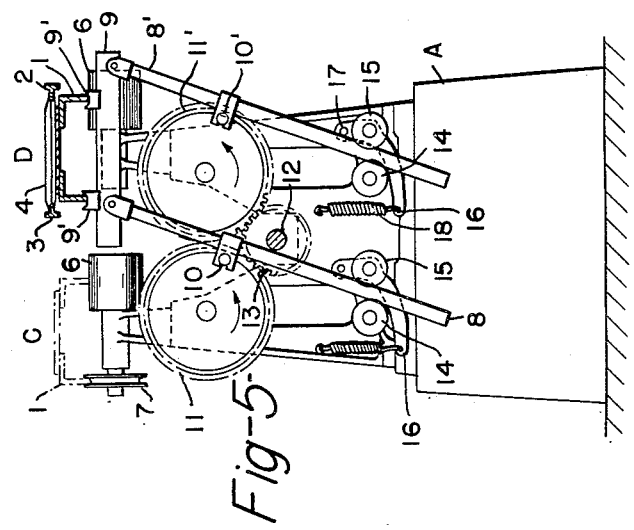
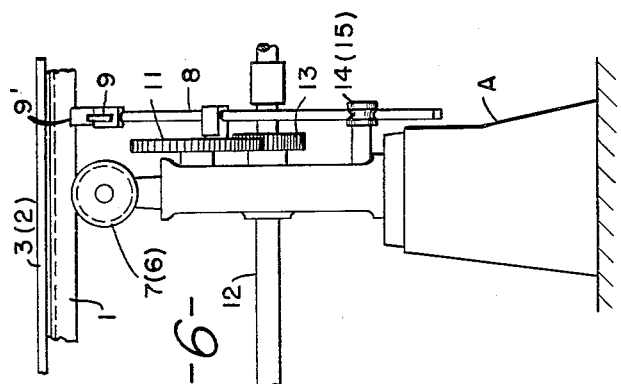
INVENTOR.
STEFAN KELLER
BY
ATTORNEY

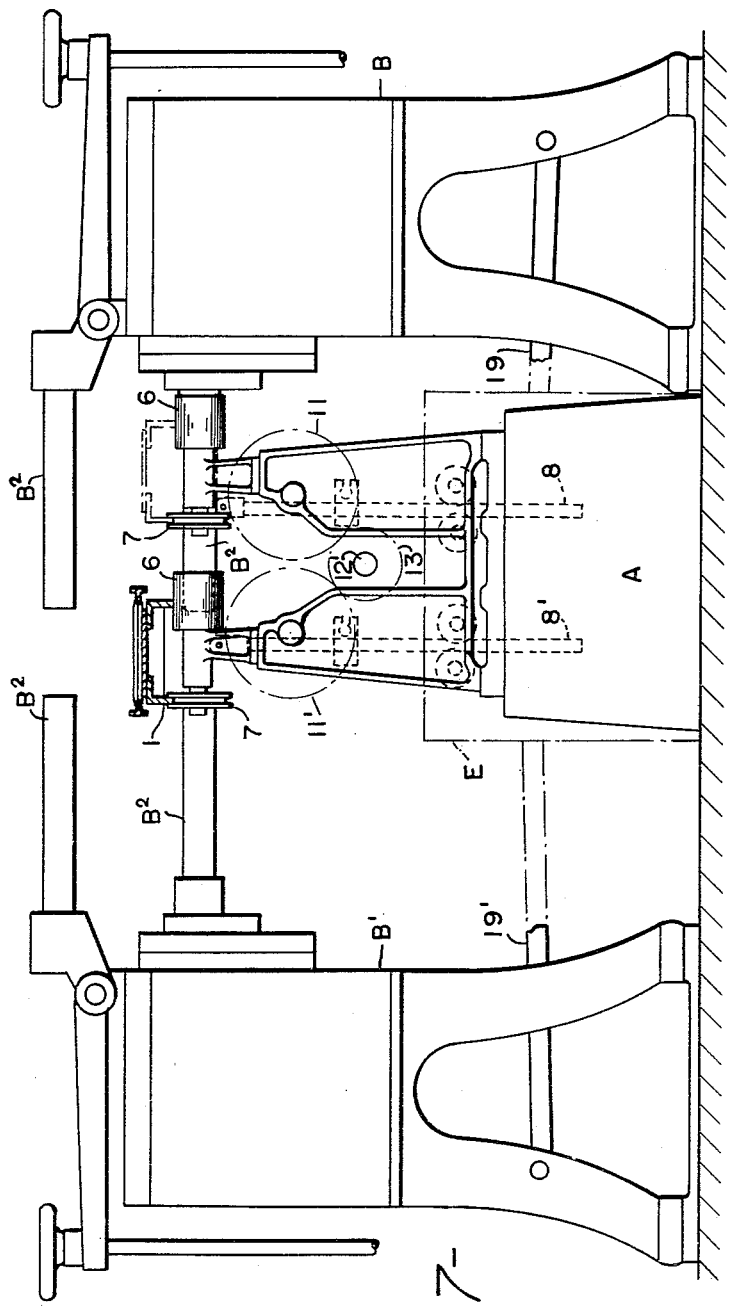
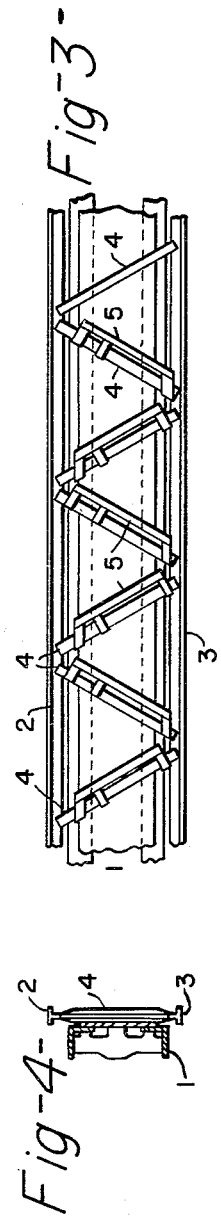

UNITED STATES PATENT OFFICE 2,529,556

APPARATUS FOR MANUFACTURE OF TRUSSES

Stefan Keller, Munchen-Pasing, Germany

Application March 9, 1949, Serial No. 80,390
In France April 15, 1948

9 Claims. (Cl. 219—4)

Steel trusses are known having chords formed of special rolled T-profiles and connected with each other by zig-zag like bent iron rods fastened to the outer faces of the legs of the chords by arc welding. Also welded steel trusses are known the chords of which consist of two round irons between which the round irons of the leg construction are arranged. In both cases the arrangement of the zig-zag like series of web members and the connection of said web members to the upper and lower chord of the so formed truss-like steel beam is only possible if a stable connection can be attained on the junction points by arc welding or, if desired, by autogeneous welding. Although these trusses have a series of advantages due to their small consumption of material and their light construction, they could not become important for the practice because the manner of manufacturing them was too unpractical and expensive. In contradistinction thereto the invention solves the problem to enable a series manufacture of welded trusses and, nevertheless, not only to retain the quality compared with the state of the art but also to considerably improve it.

For solving this problem it is proposed according to the invention to insert the web members separately in a welding carriage and to clamp them commonly, then to connect the chords loosely with the web members, to pass the carriage provided with the workpieces to be welded automatically through a device for welding the junction points according to the welding stroke and finally to raise the welded truss from the carriage after being released therefrom. Semi-finished products for these trusses manufactured according to the invention are preferably normal rolled T-profiles having legs of a width of 20 to 30 mm. for the manufacture of the chords while the web members may consist of V-like pressed band iron having a width of about 25 mm. and a thickness of 1.5 to 2 mm. Instead of the V-shape also other cross-sections may be used for the web members, namely a tube-like or H-shaped cross-section, thereby attaining the same success. The web members are connected to the chords of a truss by electric resistance welding on the junction points. It is suitable to weld simultaneously a plurality of junction points according to the welding stroke, different distances of junction points being passed in equal periods. To further simplify the working process the loading of the carriage with the truss parts and the raising of the ready truss from the carriage may be made on a roller conveyor (idle roller train) and the guiding of the charged carriage on a second roller conveyor (welding roller train) arranged parallelly to the first mentioned roller conveyor (idle roller train). In this way a series manufacture is possible with the result that not only the welding and dimensioning of the trusses is free of objection but also a greatest possible number of finished trusses may be produced with relatively few working-hours. V-shaped web members embracing the chord leg on both side-faces have the additional advantage that they may be welded to the middle leg of the chord simultaneously on both side-faces, whereby an ideal connection results.

To guarantee trueness to size also in the event of unfavourable working conditions the carriage loaded with the work-pieces is suitably conveyed through an adjusting device during the welding operation for the purpose to hold the chords in the correct distance from each other. To assist the series manufacture preferably one carriage is turned over from the inserting or loading place of the idle roller train to the welding conveyor and simultaneously a second carriage from the welding conveyer to the raising place of the idle roller train in a circuit.

A further object of the invention is an apparatus for executing the new process of manufacture, said apparatus being provided with two parallelly arranged roller conveyers, the one being the idle roller train and the other the welding train. The conveyers are connected with each other by turning-over devices arranged at the ends of the trains and being commonly driven. The roller conveyers may consist of guiding and broad supporting rollers. On both sides of the roller conveyer preferably a multiple spot welding device is arranged, the opposite electrodes of which being shifted against each other preferably for half of the distance of the junction points belonging to the same chord. In this way a plurality of aslant arranged junction points may be welded at the same time, a fact essentially assisting in the acceleration of the process of manufacture.

The multiple spot welding device may be provided with a central controlling device automatically controlling the step-wise conveying of the loaded carriage corresponding to the weld stroke, the selection of the welding points, the exact adjusting of the chords with respect to their distance during the welding operation, the operating of the welding electrodes (pressure of the electrodes) and the switching on and the switching off of the welding current.

For the purpose to guide the carriages in a circuit suitably the turning-over devices consist of two parallelly guided crank rockers coupled with each other, the crank point of which lying between their end points execute a full circular rotation while their end points on the one end are connected with each other by a swinging ledge and the other ends are guided between two guiding rollers. The swinging ledges may be provided with adjustable supports for supporting the carriages. Suitably one of the said guiding rolls is stationary while the other is yieldingly arranged, for instance, by means of a spring.

Further advantages and details of the subject matter of the invention are fully explained hereafter by the embodiment of the invention shown by way of example in the accompanying drawing.

Fig. 1 is a diagrammatical general view of an apparatus according to the invention;

Fig. 2 is a plan-view of Fig. 1;

Fig. 3 is a part of a carriage with the truss to be welded in a plan-view;

Fig. 4 is a cross-section thereof;

Fig. 5 shows one of the roller standards with the turning over device in a sectional view according to line V—V of Fig. 1;

Fig. 6 is a front view of a roller standard and

Fig. 7 is a section according to line VII—VII of Fig. 1.

The apparatus consists essentially of a conveyer track composed of roller brackets A and interrupted in its width by an electric resistance welding unit B. The conveyer track consists of two trains C and D the one of them (C) being an idle roller train and the other (D) being the real welding-roller train. The welding operation is automatically controlled by an automatic switching device E while the carriage is loaded with the work-pieces to be welded and the welded trusses are removed from the carriage by hand.

The truss to be welded is conveyed along the conveyer track on a carriage 1 (Figs. 3 and 4). The chords 2 and 3 of a truss shall be connected with each other by means of the web members 4 by welding. The web members have for instance a V-shaped cross-section and are slitted on the ends. They are fastened on the carriage by holding means 5 for the purpose to secure their correct position during the welding. The chords having a T-shaped cross-section are only pushed into the slots on the ends of the web members projecting over the carriage.

For the purpose to attain an uninterrupted welding operation at least two carriages are provided one of which being on the idle roller train and the other on the welding-roller train. During the time that one carriage is loaded on the idle roller train the other one passes through the welding unit on the welding roller train. The turning over of the two carriages before and after the welding operation occurs simultaneously by means of a turning over device provided on the roller brackets A and illustrated in Figs. 5 and 6.

The roller brackets A forming the conveyer track are provided each with a broad roller 6 and a grooved disc 7 for either of the two trains. The carriages 1 are provided with bent over flanges, the one being guided by the groove of the disc or roller 7 and the other being supported by the broad supporting roller 6. The carriages are raised and turned over from the one to the other train by means of two crank rockers 8 and $8^1$ connected with each other on their upper ends by a ledge 9. The crank rockers are linked to toothed wheels 11 and $11^1$ by means of pivots 10 and $10^1$, said toothed wheel being supported by the brackets A and commonly driven by a toothed wheel 13 arranged on a shaft 12. The shaft 12 extends along the train and is journalled in the brackets A. The lower ends of the crank rockers slide between guiding rollers 14 and 15. The roller 14 is stationary supported by the brackets A while the roller 15 is supported by a lever arm 16 rotatable about the pivot 17 and pressing the roller against the crank rocker under the influence of a spring 18 thereby avoiding the rocker to get jammed when it swings to and fro. The swinging ledge 9 is provided with supports $9^1$ adapted to support the flanges of the carriages 1. The supports $9^1$ are adjustable along the swinging ledge and may be fixed in the adjusted position by any suitable means for the purpose to support carriages of different sizes.

As the two carriages are turned over simultaneously and in opposite directions each half of the train must be provided with its own driving shaft. The shaft 12 arranged on the loading side is driven by an electromotor 20 mounted on the end of the train, a gearing 21 being interposed. A similar arrangement is provided on the raising side where the shaft $12^1$ is driven by the motor $20^1$ and the gearing $21^1$. Naturally also both shafts may be driven by a common motor or, if desired, by hand. In that event an intermediate toothed wheel must be provided in the gearing for the purpose to reverse the rotating direction.

In the midst of the roller track a multiple spot welding device is mounted consisting in the embodiment shown of two double spot resistance welding machines B and $B^1$ (Fig. 7) arranged opposite, the electrodes $B^2$ of which are shifted against each other for the half of the distance of two junction points belonging to the same chord. Thereby simultaneously four web members may be welded to the chord on two diagonally opposite junction points. The welding operation and the stepwise conveying from one weld point to the next one is automatically controlled by an automatic switching apparatus E driven by the main shaft and connected with the two welding machines by switching levers 19 and $19^1$. The automatic switching apparatus is only indicated in the drawing by a dot-and-dash line. It may be of any suitable construction and adapted to control the stepwise conveying of the loaded carriage corresponding to the weld stroke, the selection of the welding points, the exact adjusting of the chords with respect to their distance during the welding operation, the operating of the welding electrodes and the switching on and switching off of the welding current. The carriages go through the plant in a cycle.

The carriage 1 supported by the idle roller train C on the left hand side (Fig. 2) is loaded with the parts of the truss to be welded as to be seen in Fig. 3 on an enlarged scale. During that time the second carriage 1 passes on the welding roller train D in the direction of the arrow $p^2$ through the welding machines. After the welding is finished the turning over device is operated automatically or by hand whereby simultaneously both carriages are turned over from the idle roller train to the welding roller train and vice versa respectively as indicated by the arrows $p^1$ and $p^3$.

After the carriage with the welded truss being unloaded it is again conveyed to the loading place in the direction of the arrow $p^4$ for the purpose to be again loaded while at the same time the other carriage passes through the welding machines. An adjusting device may be arranged on the roller track to automatically secure the correct distance of the chords during the welding operation.

I claim:

1. In an apparatus for the weld-production of lattice beams composed of lateral chords and cross struts, a conveyor track, a welding unit positioned in the approximate center of said track, two adjacent roller trains one being an idling and the other one a welding roller train parallelly located on said track, conveyors supported on said roller trains, means to move stepwise and for the distance between the ends of two adjacent parallel cross struts said welding roller train through the operational range of said welding unit and switch means to operate said welding unit during the passage of said beam portions.

2. In an apparatus for the weld-production of lattice beams composed of lateral chords and cross struts a conveyor track, a welding unit positioned in the approximate center of said track, two adjacent roller trains one being an idling and the other one a welding roller train parallelly located on said track, conveyors removably supported on said roller trains, means to move stepwise said welding roller train through the operational range of said welding unit, switch means to operate said welding unit during the passage of said beam constituents, and turnover devices located at the ends of said trains for the simultaneous changeover of a conveyor from the idling onto the welding roller train and of another conveyor from the welding onto the idling roller train.

3. In an apparatus for the weld-production of lattice beams composed of lateral chords and diagonal cross struts with slotted ends engaging said chords, a conveyor track, a welding unit positioned in the approximate center of said track, two adjacent roller trains one being an idling and the other one a welding rolling train parallelly located on said track, said roller trains being composed of flat rollers and of grooved discs connected by transverse rods, conveyors removably supported on said roller trains, means on said conveyors to removably hold thereon the slotted ends of said struts holding said lateral chords, means to move stepwise and for the distance between the ends of two adjacent parallel struts said welding roller train through the operational range of said welding unit, and switch means to operate said welding unit during the passage of said beam portions.

4. In an apparatus for the weld-production of lattice beams composed of lateral chords connected by diagonal cross struts having slotted ends engaging said chords, a conveyor track, a welding unit positioned in the approximate center of said track, two adjacent roller trains parallelly located on said track, a multiple spot welding device positioned in the approximate center of said track having opposite electrodes at both sides of said roller trains the electrodes being displaced in the direction of said track at about one-half of the distance between the chord and struts connecting points of said chord, conveyors removably supported on said roller trains, means on said conveyors to removably hold thereon the slotted ends of said struts holding said lateral chords, means to move stepwise and for the distance between the ends of two adjacent parallel struts said welding roller train through the operational range of said welding unit, and switch means to operate said welding unit during the passage of said beam portions.

5. In an apparatus for the weld-production of lattice beams composed of lateral chords and cross struts a conveyor track, a welding unit positioned in the approximate center of said track, two adjacent roller trains one being an idling and the other one a welding roller train parallelly located on said track, conveyors removably supported on said roller trains means to stepwise move said welding roller train through the operational range of the welding unit, switch means to operate said welding unit during the passage of said beam constituents, and turnover devices located at the ends of said trains for the simultaneous changeover of a conveyor from the idling onto the welding roller train and of another conveyor from the welding onto the idling roller train, said turnover devices comprising two parallelly guided crank rockers of which the crank points are adapted to execute a full circular motion, a swinging ledge connecting the one end of said rockers, and a pair of guiding rollers engaging and guiding the other ends of the same.

6. In an apparatus for the weld-production of lattice beams composed of lateral chords and cross struts a conveyor track, a welding unit positioned in the approximate center of said track, two adjacent roller trains one being an idling and the other one a welding roller train parallelly located on said track, conveyors removably supported on said roller trains, means to stepwise move said welding roller train through the operational range of said welding unit, switch means to operate said welding unit during the passage of said beam constituents and turnover devices located at the ends of said trains for the simultaneous changeover of a conveyor from the idling onto the welding roller train and of another conveyor from the welding onto the idling roller train, each of said turnover devices comprising two parallelly guided crank rockers of which the crank points are adapted to execute a full circular motion, a swinging ledge connecting the one end of said rockers, and supporting means arranged on said swinging ledge adapted to support the said conveyors during the turnover movement.

7. In an apparatus for the weld-production of lattice beams composed of lateral chords and cross struts a conveyor track, a welding unit positioned in the approximate center of said track, two adjacent roller trains one being an idling and the other one a welding roller train parallelly located on said track, conveyors removably supported on said roller trains, means to stepwise move said welding roller train through the operational range of said welding unit, switch means to operate said welding unit during the passage of said beam constituents and turnover devices located at the ends of said trains for the simultaneous changeover of a conveyor from the idling onto the welding roller train and of another conveyor from the welding onto the idling roller train, said turnover devices comprising each two parallelly guided crank rockers of which the crank points are adapted to execute a full circular motion, a swinging ledge connecting the one end of said rockers, and a pair of guiding rollers engaging and guiding the other ends of said rockers, the one guiding roller being stationary, and a spring to hold the other guiding roller in yielding contact with said rockers.

8. In an apparatus for the weld-production of lattice beams composed of lateral chords and cross struts a conveyor track, a welding unit positioned in the approximate center of said track, two adjacent roller trains one being an idling and the other one a welding roller train parallelly located on said track, conveyors removably supported on said roller trains, means to stepwise move said welding roller train through the operational range of said welding unit, switch means to operate said welding unit during the passage of said beam constituents and turnover devices located at the ends of said train for the simultaneous changeover of a conveyor from the idling onto the welding roller train and of another conveyor from the welding onto the idling roller train, said turnover devices comprising a post, rotatable toothed wheels supported by said post and provided with crank pins, parallel crank rockers operatively connected with said crank pins, a swinging ledge connecting the upper ends of said rockers, and a pair of guiding rollers engaging and guiding the lower end thereof.

9. In an apparatus for the weld-production of lattice beams composed of lateral chords and cross struts a conveyor track, a welding unit positioned in the approximate center of said track, two adjacent roller trains one being an idling and the other one a welding roller train parallelly located on said track, conveyors removably supported on said roller train, means to stepwise move said welding roller train through the operational range of said welding unit, switch means to operate said welding unit during the passage of said beam constituents, turnover devices located at the ends of said trains for the simultaneous changeover of a conveyor from the idling onto the welding roller train and of another conveyor from the welding onto the idling roller train and means located at the ends of said trains to move said turnover devices in opposite directions.

STEFAN KELLER.

REFERENCES CITED

The following references are of record in the file of this patent:

UNITED STATES PATENTS

| Number | Name | Date |
|---|---|---|
| 1,753,070 | Schwartz et al. | Apr. 1, 1930 |
| 1,792,066 | Bowlus | Feb. 10, 1931 |
| 2,293,169 | Platz | Aug. 18, 1942 |
| 2,359,434 | McNeil | Oct. 3, 1944 |